United States Patent
Wang

(10) Patent No.: US 11,247,734 B2
(45) Date of Patent: Feb. 15, 2022

(54) SYSTEM FOR CONTROLLING TILTING OF A CAB FOR A COMMERCIAL VEHICLE

(71) Applicants: HYUNDAI MOTOR COMPANY, Seoul (KR); KIA MOTORS CORPORATION, Seoul (KR)

(72) Inventor: Hyun Dong Wang, Daegu (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 247 days.

(21) Appl. No.: 16/540,393

(22) Filed: Aug. 14, 2019

(65) Prior Publication Data

US 2020/0189667 A1 Jun. 18, 2020

(30) Foreign Application Priority Data

Dec. 14, 2018 (KR) .................... 10-2018-0162040

(51) Int. Cl.
*B62D 33/073* (2006.01)
*B62D 33/067* (2006.01)

(52) U.S. Cl.
CPC ......... *B62D 33/073* (2013.01); *B62D 33/067* (2013.01)

(58) Field of Classification Search
CPC ............................ B62D 33/063; B62D 33/067
See application file for complete search history.

(56) References Cited

U.S. PATENT DOCUMENTS 4,452,329 A * 6/1984 Stone .................. B62D 33/067
180/89.15
5,839,278 A * 11/1998 Sonneborn ............. B62D 33/07
60/403

(Continued)

FOREIGN PATENT DOCUMENTS

DE 102016203539 A1 * 9/2017 ................ B60P 1/16
EP 3323699 A1 * 5/2018 ......... B62D 33/0608

(Continued)

OTHER PUBLICATIONS

Bae Sung-Jin, Truck cab tilting safety device, Sep. 15, 1998, EPO, KR 19980046518 A, Machine Translation of Description (Year: 1998).*

(Continued)

*Primary Examiner* — Paul N Dickson
*Assistant Examiner* — Matthew D Lee
(74) *Attorney, Agent, or Firm* — Lempia Summerfield Katz LLC

(57) ABSTRACT

A system for controlling tilting of a cab for a commercial vehicle includes: a tilt switch receiving a user's tilt-up or down request; a drive unit tilting up or down the cab of the commercial vehicle; a front detection sensor installed on the cab of the commercial vehicle detecting an obstacle in front of the vehicle; and a control unit identifying whether the user's request is a tilt-up or down based on a lapse of time during the tilt switch is pressed, controlling the drive unit to tilt up or down the cab in accordance with the identification of the tilt-up or down, and stopping a tilt-up operation of the drive unit when an obstacle is detected by the front detection sensor within a predetermined distance during the operation of the drive unit.

6 Claims, 4 Drawing Sheets

(56) References Cited

U.S. PATENT DOCUMENTS

| | | | | |
|---|---|---|---|---|
| 8,991,538 B2* | 3/2015 | Angelo | ............... | B62D 33/073 |
| | | | | 180/89.13 |
| 2006/0084479 A1* | 4/2006 | Kim | ..................... | H04W 24/00 |
| | | | | 455/566 |
| 2013/0084790 A1* | 4/2013 | Furuse | ..................... | B60H 1/32 |
| | | | | 454/75 |

FOREIGN PATENT DOCUMENTS

| | | | | | |
|---|---|---|---|---|---|
| JP | 2005207065 | A | * | 8/2005 | |
| KR | 19980046518 | A | * | 9/1998 | |
| KR | 100776657 | B1 | * | 11/2007 | |
| KR | 20180068018 | A | * | 6/2018 | ............... B60P 1/16 |
| KR | 20180068018 | A | | 6/2018 | |
| WO | WO-2018112568 | A1 | * | 6/2018 | ............. G01S 17/04 |

OTHER PUBLICATIONS

Kurtzke, Device And Method For Controlling A Lifting Device, Sep. 7, 2017, EPO, DE 102016203539 A1, Machine Translation of Description (Year: 2017).*

Choi, Tilt Controlling Method for Cap of Truck, Jun. 21, 2018, EPO, KR 20180068018 A, Machine Translation of Description (Year: 2018).*

* cited by examiner

SYSTEM FOR CONTROLLING TILTING OF A CAB FOR A COMMERCIAL VEHICLE

CROSS REFERENCE TO RELATED APPLICATION

The present application claims priority to Korean Patent Application No. 10-2018-0162040, filed on Dec. 14, 2018, the entire contents of which is incorporated herein for all purposes by this reference.

BACKGROUND

1. Technical Field

The present disclosure relates to a system for controlling tilting of a cab for a commercial vehicle. The system is capable of more safely controlling a switch, while saving costs, by reducing the number of switches. From a user's viewpoint, the system has improved intuitiveness in the operation of the switch by incorporating relevant functions into one switch.

2. Description of the Related Art

In general, a lorry of 5 tons or more may be provided with a cab tilting device for inclining or elevating a frame that includes a driver's seat (hereinafter, referred to as a "cab") toward a front to improve merchantability. Such a cab tilting device may be mainly used for checking various devices including an engine compartment equipped with an engine. An operation switch for tilting the cab may be mainly installed on a vehicle body frame behind the cab.

In a conventional cab tilting device, when a driver operates the operation switch, a cab tilting motor may operate to extend or retract a cylinder installed under the cab, thereby tilting the cab.

The conventional system has the following problems. In the conventional system, there is no logic to reconfirm a vehicle speed when generating the vehicle speed after first confirming that the gear is in a neutral position and the vehicle speed is zero. In the conventional system, a key is generally used for emergency stop. However, safety of the system is deteriorated due to the key being inserted into an insertion slot. In addition, there is no safety logic for passengers sitting in the cab when the emergency key is used. Furthermore, there is no logic to check a state of the cab and ascertain whether the cab is to be raised or lowered in a case where a tilting operation is tried again at an emergency stop when a limit switch and a lock switch are both powered on during tilting the cab.

The contents described as the related art have been provided only to assist in understanding the background of the present disclosure and should not be considered as corresponding to the related art known to those having ordinary skill in the art.

SUMMARY

An object of the present disclosure is to provide a system for controlling tilting of a cab for a commercial vehicle. The disclosed system is capable of more safely controlling a switch, while saving costs, by reducing the number of switches. From a user's viewpoint, the disclosed system has improved intuitiveness in the operation of the switch by incorporating relevant functions into one switch.

According to an embodiment of the present disclosure, a system for controlling tilting of a cab for a commercial vehicle includes a tilt switch configured to receive a tilt-up request or a tilt-down request. The system includes a drive unit configured to tilt up or tilt down the cab of the commercial vehicle. The system includes a front detection sensor installed on the cab of the commercial vehicle and configured to detect an obstacle in front of the vehicle. The system includes a control unit configured to identify the tilt-up request or the tilt-down request based on a lapse of time during which the tilt switch is pressed, control the drive unit to tilt-up or tilt-down the cab in accordance with the identification of the tilt-up request or the tilt-down request, and stop a tilt-up operation of the drive unit when an obstacle is detected by the front detection sensor within a predetermined distance during the operation of the drive unit.

The drive unit may include a motor configured to form hydraulic pressure and a cylinder configured to be moved up and down by the hydraulic pressure.

The control unit may be configured to determine that the tilt-up operation is terminated after a predetermined time elapses from a drive start of the drive unit and stop the operation of the drive unit when the control unit operates the drive unit to tilt up the cab in accordance with the tilt-up request.

The system for controlling tilting of the cab for the commercial vehicle may further include a key detection sensor configured to detect whether or not a smart key for the vehicle exists in the cab, where the control unit may operate the drive unit when the smart key is not detected in the cab by the key detection sensor upon the tilt-up request or the tilt-down request.

The control unit may operate the drive unit when a parking brake of the vehicle is locked and a gear is in a neutral position upon the tilt-up request or the tilt-down request.

The control unit may stop a tilt-up or tilt-down operation of the drive unit when the tilt switch is re-input during the operation of the drive unit in accordance with the tilt-up request or the tilt-down request.

The control unit may stop the tilt-up or tilt-down operation of the drive unit when a vehicle speed is detected to be higher than a predetermined vehicle speed during the operation of the drive unit in accordance with the tilt-up request or the tilt-down request.

DETAILED DESCRIPTION OF THE EMBODIMENTS

Hereinafter, a system for controlling tilting of a cab for a commercial vehicle according to embodiments of the present disclosure is described with reference to the accompanying drawings.

Figure 1:
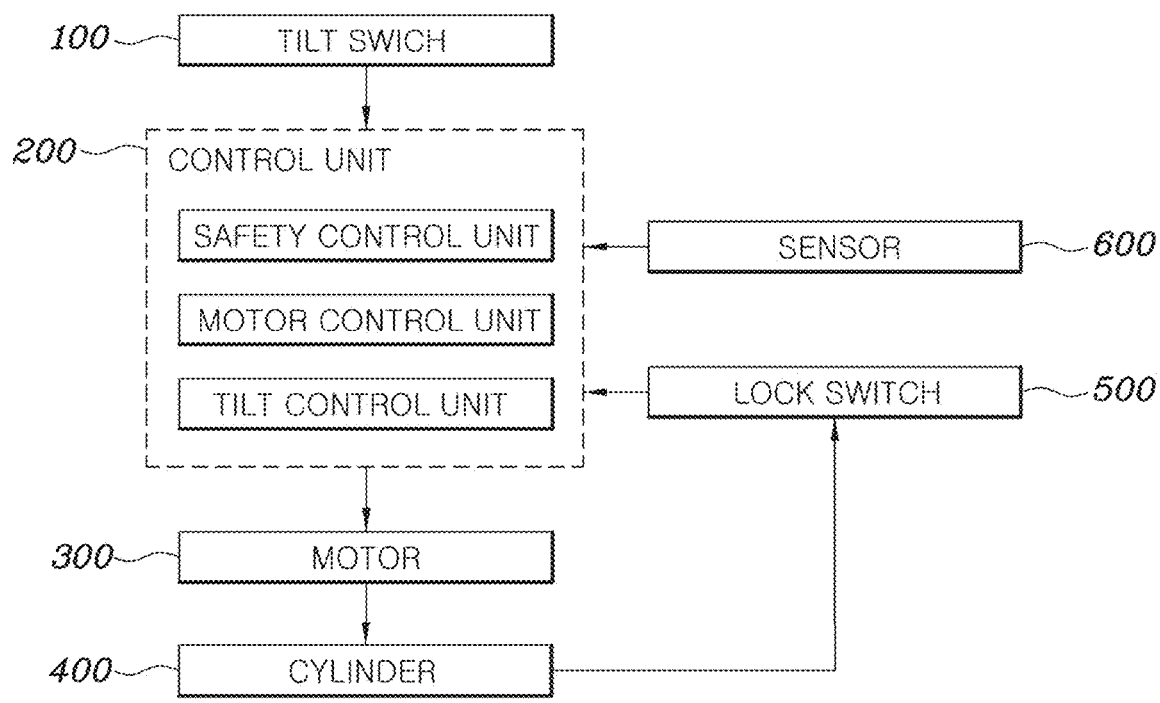
FIG. 1 is a view illustrating a configuration of a system for controlling tilting of a cab for a commercial vehicle according to an embodiment in the present disclosure.
Figure 2:
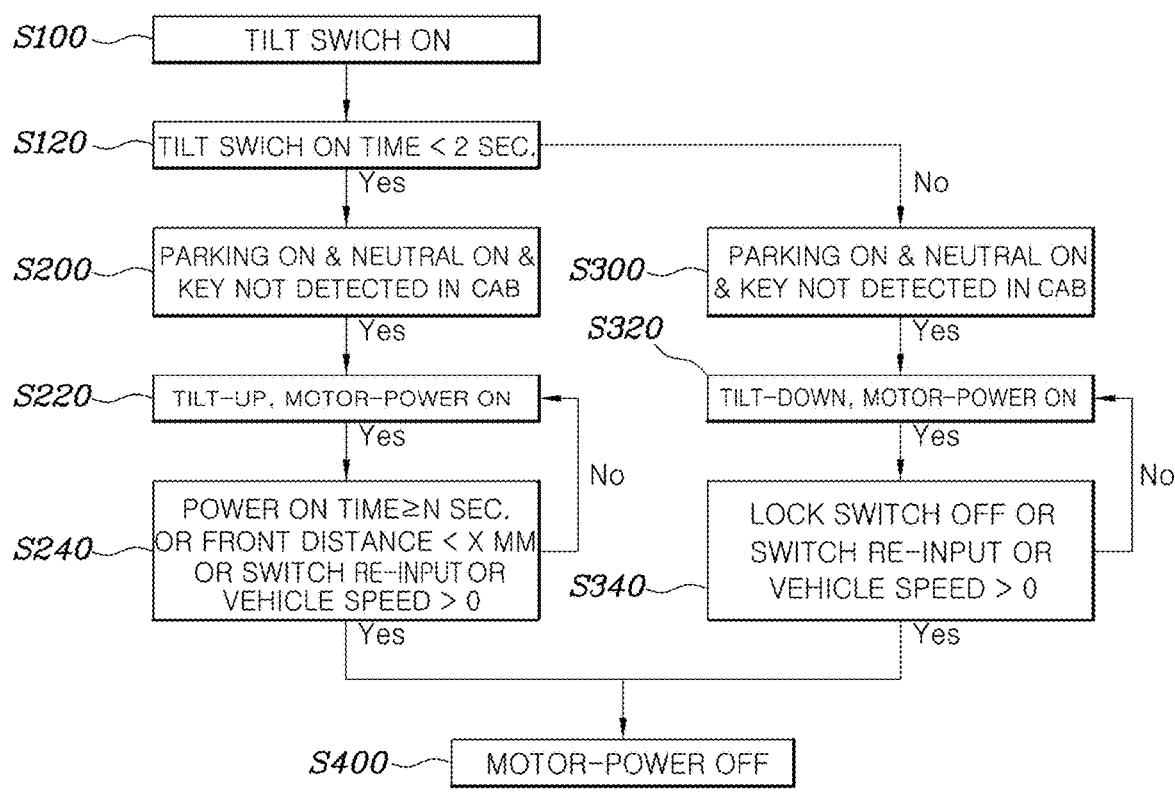
FIG. 2 is a flowchart illustrating a control method of the system for controlling tilting of a cab for a commercial vehicle according to an embodiment in the present disclosure.
Figure 3:
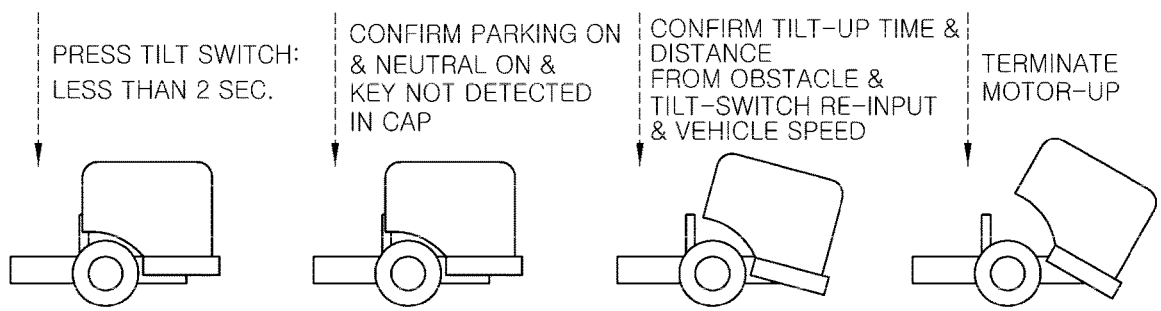
FIG. 3 is a view illustrating a cab tilt-up process of the system for controlling tilting of a cab for a commercial vehicle according to an embodiment in the present disclosure.
Figure 4:
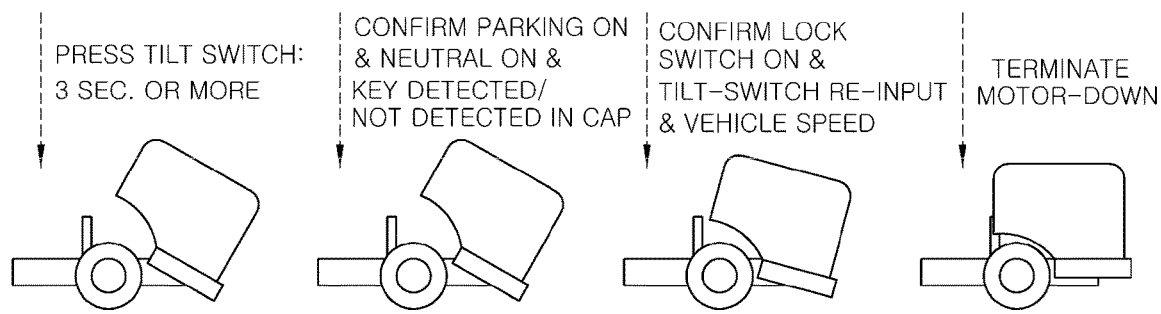
FIG. 4 is a view illustrating a cab tilt-down process of the system for controlling tilting of a cab for a commercial vehicle according to an embodiment in the present disclosure.

FIG. 1 is a view illustrating a constitution of a system for controlling tilting of a cab for a commercial vehicle according to an embodiment in the present disclosure. FIG. 2 is a flowchart illustrating a control method of the system for controlling tilting of a cab for a commercial vehicle according to an embodiment in the present disclosure. FIG. 3 is a view illustrating a cab tilt-up process of the system for controlling tilting of a cab for a commercial vehicle according to an embodiment in the present disclosure. FIG. 4 is a view illustrating a cab tilt-down process of the system for controlling tilting of a cab for a commercial vehicle according to an embodiment in the present disclosure.

According to an embodiment of the present disclosure, a system for controlling tilting of a cab for a commercial vehicle includes a tilt switch 100 receiving a user's tilt-up or tilt-down request The system includes a drive unit tilting up or tilting down the cab of the commercial vehicle. The system includes a front detection sensor installed on the cab of the commercial vehicle detecting an obstacle in front of the vehicle. The system includes a control unit 200 identifying whether the user's request is a tilt-up or tilt-down based on a lapse of time during which the tilt switch 100 is pressed, controlling the drive unit to tilt up or tilt down the cab in accordance with the identification of the tilt-up or tilt-down, and stopping a tilt-up operation of the drive unit when an obstacle is detected by the front detection sensor within a predetermined distance during the operation of the drive unit.

A sensor 600 pre-installed on the vehicle may be used in the present disclosure as shown in the drawings. The sensor 600 may typically include a front detection sensor.

The drive unit may include a motor 300 forming hydraulic pressure and a cylinder 400 that is moved up and down by the hydraulic pressure. The motor 300 may thus operate upon a request of the control unit 200. The cab may be tilted using the cylinder 400.

Meanwhile, the vehicle may be provided with the tilt switch 100 receiving the tilt-up or tilt-down request from the user. The user may identify the tilt-up or tilt-down request using the single tilt switch 100 and may also conduct an emergency stop using the same tilt switch 100. This may thus be advantageous in that cost is reduced by reducing the number of switches. The user's intuitiveness and responsiveness is also greatly improved.

Specifically, the front detection sensor may be installed on the cab of the commercial vehicle to detect an obstacle in front of the vehicle. The front detection sensor may be used not only when the cab is tilted, but also when the vehicle is traveling, as the sensor 600 usually watches a front of the vehicle. Various sensors such as a radar, a camera, and an infrared ray may be utilized as the front detection sensor and may be allowed to usually watch the front of the vehicle.

The control unit 200 may identify whether the user request is a tilt-up or tilt-down request based on a lapse of time during which the tilt switch 100 is pressed, control the drive unit to tilt up or tilt down the cab in accordance with the identification of the tilt-up or tilt-down, and stop the tilt-up operation of the drive unit when an obstacle is detected by the front detection sensor within a predetermined distance during the operation of the drive unit.

That is, the control unit 200 may identify whether the user request is a tilt-up or tilt-down request based on the lapse of time during which the tilt switch 100 is pressed. For example, the switch may be pressed briefly for a tilt-up request and may be pressed for a long time for a tilt-down request so that a number of switches may be incorporated into one. The control unit 200 may determine that the tilt-up operation is terminated after a predetermined time elapses from a drive start of the drive unit and may then stop the operation of the drive unit when the control unit 200 operates the drive unit to tilt up the cab in accordance with the tilt-up request.

The system for controlling tilting of a cab for a commercial vehicle further includes a key detection sensor to detect whether or not a user's or a designated smart key for the vehicle exists in the cab. A conventional radio frequency antenna may also be used as the key detection sensor. The control unit 200 may operate the drive unit when the user's smart key is not detected by the key detection sensor to be in the cab upon the user's tilt-up or down request. In this way, the user's safety is taken into consideration so that the cab may be tilted safely.

In addition, the control unit 200 may operate the drive unit when a parking brake of the vehicle is locked and the gear is in a neutral position upon the user's tilt-up or tilt-down request.

The control unit 200 may stop a tilt-up or tilt-down operation of the drive unit when the tilt switch 100 is re-input or operated again by the user during the operation of the drive unit in accordance with the user's tilt-up or tilt-down request. That is, an emergency stop switch is not separately provided but is incorporated into the tilt switch 100, thereby saving the cost of having an additional switch. A safety accident may also be prevented due to an error of an individual switch in advance by allowing the control unit to perform such a function The control unit 200 may stop the tilt-up or tilt-down operation of the drive unit when the vehicle speed is detected to be higher than a predetermined vehicle speed during the operation of the drive unit in accordance with the user's tilt-up or tilt-down request, thereby protecting the user and surrounding pedestrians more safely.

FIG. 2 is a flowchart illustrating a control method of the system for controlling tilting of a cab for a commercial vehicle according to an embodiment in the present disclosure. FIG. 3 is a view illustrating a cab tilt-up process of the system for controlling tilting of a cab for a commercial vehicle according to an embodiment in the present disclosure. FIG. 4 is a view illustrating a cab tilt-down process of the system for controlling tilting of a cab for a commercial vehicle according to an embodiment in the present disclosure.

When the operation of the tilt switch is detected (S100), the tilt-up or tilt-down may be identified based on the lapse of time during which the switch is pressed (S120). When the cab is tilted up or down, the parking brake, the gear, and the smart key may be detected to confirm safety. The tilt-up or tilt-down may be performed in accordance with an operation of the motor (S220 or S320) when the parking position is on, the neutral position is on, and the smart key is not detected in the cab (S200 or S300). The tilt-up may be determined to have reached a limit thereof after a predetermined time elapses during the tilt-up. The tilt-up process may be terminated by powering off the motor 300 (S400) when the motor 300 has been powered on for N seconds or longer, there is an obstacle in front of the vehicle within a front distance less than X mm, the tilt switch is re-input or operated again, or the vehicle speed is measured or sensed (S240).

In addition, a tilt-down operation is stopped, by powering off the motor 300 (S400), to ensure safety when a lock switch that is automatically powered on at the termination of the tilt-up is powered off, the tilt switch is re-input or operated again, or the vehicle speed is measured or sensed (S340), during the tilt-down and the motor-power on (S320).

According to the system for controlling tilting of a cab for a commercial vehicle in the present disclosure, the switch can be more safely controlled, while reducing cost, by reducing the number of switches. From a user's viewpoint, intuitiveness in the operation of the switch can be improved by incorporating relevant functions into one switch.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A system for controlling tilting of a cab for a commercial vehicle, the system comprising:
   a tilt switch for receiving a request from a user, the request being a tilt-up request or a tilt-down request;
   a drive unit for tilting up or tilting down the cab of the commercial vehicle;
   a front detection sensor installed on the cab of the commercial vehicle for detecting an obstacle in front of the vehicle; and
   a control unit for identifying whether the request is a tilt-up request or a tilt-down request based on a lapse of time during which the tilt switch is pressed, for controlling the drive unit to tilt up or tilt down the cab in accordance with the identification of the tilt-up request or the tilt-down request, and for stopping a tilt-up operation of the drive unit when an obstacle is detected by the front detection sensor within a predetermined distance during the tilt-up operation of the drive unit,
   wherein the control unit stops the tilt-up operation or a tilt-down operation of the drive unit when the tilt switch is re-input during the tilt-up operation or the tilt-down operation of the drive unit respectively in accordance with the tilt-up request or the tilt-down request.

2. The system of claim 1, wherein the drive unit includes a motor for forming hydraulic pressure and a cylinder moved up and down by the hydraulic pressure.

3. The system of claim 2, wherein the control unit determines that the tilt-up operation is terminated after a predetermined time elapses from a drive start of the drive unit and stops the operation of the drive unit when the control unit operates the drive unit to tilt up the cab in accordance with the tilt-up request.

4. The system of claim 1, further comprising a key detection sensor for detecting whether or not a smart key for the vehicle exists in the cab,
   wherein the control unit operates the drive unit when the smart key is not detected in the cab by the key detection sensor upon the tilt-up request or the tilt-down request.

5. The system of claim 1, wherein the control unit operates the drive unit when a parking brake of the vehicle is locked and a gear is in a neutral position upon the tilt-up request or the tilt-down request.

6. The system of claim 1, wherein the control unit stops the tilt-up operation or the tilt-down operation of the drive unit when a vehicle speed is detected to be higher than a predetermined vehicle speed during the operation of the drive unit in accordance with the tilt-up request or the tilt-down request.

* * * * *